(12) United States Patent
Lei

(10) Patent No.: US 12,633,761 B2
(45) Date of Patent: May 19, 2026

(54) SMART TERMINAL AND CONTROL METHOD THEREFOR

(71) Applicant: HUIZHOU TCL MOBILE COMMUNICATION CO., LTD., Huizhou (CN)

(72) Inventor: Chunlin Lei, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 718 days.

(21) Appl. No.: 18/005,966

(22) PCT Filed: Sep. 8, 2020

(86) PCT No.: PCT/CN2020/113917
§ 371 (c)(1),
(2) Date: Jan. 18, 2023

(87) PCT Pub. No.: WO2022/016680
PCT Pub. Date: Jan. 27, 2022

(65) Prior Publication Data
US 2023/0299594 A1     Sep. 21, 2023

(30) Foreign Application Priority Data

Jul. 21, 2020     (CN) .......................... 202010704030.6

(51) Int. Cl.
H02J 7/00          (2026.01)
H02J 7/40          (2026.01)
(Continued)

(52) U.S. Cl.
CPC .............. H02J 7/448 (2026.01); H02J 7/575 (2026.01); H02J 7/80 (2026.01)

(58) Field of Classification Search
USPC ......................................................... 320/106
See application file for complete search history.

(56) References Cited

U.S. PATENT DOCUMENTS

| | | | | |
|---|---|---|---|---|
| 8,981,733 | B2 * | 3/2015 | Hussain | ................ H02J 7/0071 |
| | | | | 320/164 |
| 10,224,725 | B2 * | 3/2019 | Zhang | ................... H02J 7/0013 |

(Continued)

FOREIGN PATENT DOCUMENTS

| | | |
|---|---|---|
| CN | 102545139 A | 7/2012 |
| CN | 102778943 A | 11/2012 |

(Continued)

OTHER PUBLICATIONS

International Search Report in International application No. PCT/CN2020/113917, mailed on Apr. 23, 2021.

(Continued)

*Primary Examiner* — Samuel Berhanu
(74) *Attorney, Agent, or Firm* — PV IP PC; Wei Te Chung

(57)     ABSTRACT

A smart terminal and a control method therefor. The smart terminal comprises: a control circuit, a detection circuit, a first connector and a charging circuit. The detection circuit is respectively connected to the control circuit and the first connector. The detection circuit is used for detecting an electrical signal of the first connector and feeding same back to the control circuit. The control circuit is used for determining a control instruction on the basis of the electrical signal of the first connector, the control instruction being used for controlling the charging circuit and the first connector.

13 Claims, 2 Drawing Sheets

(51) Int. Cl.
  *H02J 7/50* (2026.01)
  *H02J 7/80* (2026.01)

(56) References Cited

U.S. PATENT DOCUMENTS

| | | | |
|---|---|---|---|
| 10,298,028 B1 * | 5/2019 | Venkatasamy | ............ H02J 7/00 |
| 2013/0103966 A1 | 4/2013 | Liu | |
| 2022/0067163 A1 * | 3/2022 | Yeh | ........................... G06F 8/65 |

FOREIGN PATENT DOCUMENTS

| | | | |
|---|---|---|---|
| CN | 103022856 A | 4/2013 |
| CN | 106020406 A | 10/2016 |
| CN | 107450705 A | 12/2017 |
| CN | 107493511 A | 12/2017 |
| CN | 108880955 A | 11/2018 |
| CN | 208971213 U | 6/2019 |

OTHER PUBLICATIONS

Written Opinion of the International Search Authority in International application No. PCT/CN2020/113917,mailed on Apr. 23, 2021.
Chinese Office Action issued in corresponding Chinese Patent Application No. 202010704030.6 dated Mar. 1, 2021, pp. 1-7.

\* cited by examiner

SMART TERMINAL AND CONTROL METHOD THEREFOR

CROSS REFERENCE TO RELATED APPLICATIONS

This application is a US national phase application based upon an International Application No. PCT/CN2020/113917, filed on Sep. 8, 2020, which claims the priority of Chinese Patent Application No. 202010704030.6, entitled "SMART TERMINAL AND CONTROL METHOD THEREFOR", filed on Jul. 21, 2020, the disclosure of which is incorporated herein by reference in its entirety.

FIELD OF THE DISCLOSURE

The present disclosure relates to a smart terminal technology, and more particularly, to a smart terminal and a control method thereof.

BACKGROUND

Smart terminals, such as tablets or mobile phones, have more and more abundant contents, and there are more and more electronic devices in our home, such as speakers, keyboards, projectors, chargers, etc. If home Internet of Things (IOT) is to be implemented, various electronic devices need to be connected to the smart terminal through external connections. When various external devices are connected to the smart terminal, the smart terminal may not control different external devices because these external devices have huge differences. Thus, the home Internet of Things may not be achieved.

Therefore, when various external devices are connected to the smart terminal according to the conventional art, the smart terminal may not control different external devices, so that the home Internet of Things cannot be realized.

SUMMARY

One objective of an embodiment of the present disclosure is to provide a smart terminal and a related control method, to enable the smart terminal to perform different controls on different external devices, thereby realizing the home Internet of Things.

According to an embodiment of the present disclosure, a smart terminal is disclosed. The smart terminal comprises a first connector, a charging circuit, a control circuit, and a detection circuit. The first connector is connected to a first external device. The first connector is a pogo pin. The charging circuit is connected to the first connector. The control circuit determines a control instruction according to an electrical signal of the first connector. The control instruction is configured to control the charging circuit and the first connector. The detection circuit, connected to the control circuit and the first connector, is configured to detect the electrical signal of the first connector and provides a feedback to the control circuit.

Optionally, the detection circuit comprises a first detection circuit and a second detection circuit connected in parallel. The first connector comprises an ID pin and a first power pin, and two ends of the first detection circuit are respectively connected to the control circuit and the ID pin. Two ends of the second detection circuit are respectively connected to the control circuit and the first power pin. The first detection circuit detects an ID pin electrical signal of the ID pin to obtain a first detection signal and provides a feedback to the control circuit. The second detection circuit detects the first power pin signal of the first power pin to obtain a second detection signal and provides a feedback to the control circuit.

Optionally, the first connector comprises a first data pin, connected to the control circuit to transmit a first data signal.

Optionally, the smart terminal further includes a power management chip, connected to the first power pin and the control circuit, configured to provide a working voltage to the first power pin according to the control instruction of the control circuit.

Optionally, the first connector comprises a second data pin, and the power management chip connects the control circuit and the second data pin so that a second data signal is transmitted between the control circuit and the second data pin.

Optionally, the smart terminal further includes a first switch circuit and a second connector. The second connector is connected to a second external device. The first connector comprises a third data pin. The second connector comprises a fourth data pin. The control circuit is connected to the third data pin through the first switch circuit to transmit a third data signal, and the control circuit is connected to the fourth data pin to transmit the fourth data signal.

Optionally, a control terminal and an input end of the first switch circuit are connected to the control circuit, and an output end of the first switch circuit is connected to the third data pin.

Optionally, the smart terminal further includes a second switch circuit. The second connector comprises a second power pin configured to transmit a second power signal. A control end of the second switch circuit is connected to the control circuit, an input end of the second switch circuit is connected to the second power pin, and an output end of the second switch circuit is connected to the charging circuit. The control circuit controls an on/off state of the second switch circuit.

Optionally, the smart terminal further includes a third switch circuit. A control end of the third switch circuit is connected to the control circuit, and an input end of the third switch circuit is connected to the first power pin, and an output of the third switch circuit is connected to the charging circuit.

According to another embodiment of the present disclosure, a smart terminal is disclosed. The smart terminal comprises a first connector, a charging circuit, a control circuit, and a detection circuit. The first connector is connected to a first external device. The charging circuit is connected to the first connector. The control circuit determines a control instruction according to an electrical signal of the first connector. The control instruction is configured to control the charging circuit and the first connector. The detection circuit, connected to the control circuit and the first connector, is configured to detect the electrical signal of the first connector and provides a feedback to the control circuit.

Optionally, the detection circuit comprises a first detection circuit and a second detection circuit connected in parallel. The first connector comprises an ID pin and a first power pin, and two ends of the first detection circuit are respectively connected to the control circuit and the ID pin. Two ends of the second detection circuit are respectively connected to the control circuit and the first power pin. The first detection circuit detects an ID pin electrical signal of the ID pin to obtain a first detection signal and provides a feedback to the control circuit. The second detection circuit detects the first power pin signal of the first power pin to obtain a second detection signal and provides a feedback to the control circuit.

Optionally, the first connector comprises a first data pin, connected to the control circuit to transmit a first data signal.

Optionally, the smart terminal further includes a power management chip, connected to the first power pin and the control circuit, configured to provide a working voltage to the first power pin according to the control instruction of the control circuit.

Optionally, the first connector comprises a second data pin, and the power management chip connects the control circuit and the second data pin so that a second data signal is transmitted between the control circuit and the second data pin.

Optionally, the smart terminal further includes a first switch circuit and a second connector. The second connector is connected to a second external device. The first connector comprises a third data pin. The second connector comprises a fourth data pin. The control circuit is connected to the third data pin through the first switch circuit to transmit a third data signal, and the control circuit is connected to the fourth data pin to transmit the fourth data signal.

Optionally, a control terminal and an input end of the first switch circuit are connected to the control circuit, and an output end of the first switch circuit is connected to the third data pin.

Optionally, the smart terminal further includes a second switch circuit. The second connector comprises a second power pin configured to transmit a second power signal. A control end of the second switch circuit is connected to the control circuit, an input end of the second switch circuit is connected to the second power pin, and an output end of the second switch circuit is connected to the charging circuit. The control circuit controls an on/off state of the second switch circuit.

Optionally, the smart terminal further includes a third switch circuit. A control end of the third switch circuit is connected to the control circuit, and an input end of the third switch circuit is connected to the first power pin, and an output of the third switch circuit is connected to the charging circuit.

According to still another embodiment of the present disclosure, a method of controlling a smart terminal is provided. The method includes acquiring an electrical signal of a first connecter, and determining a control instruction according to the electrical signal of the first connector.

Optionally, the detection circuit comprises a first detection circuit and a second detection circuit connected in parallel. The first connector comprises an ID pin and a first power pin, and two ends of the first detection circuit are respectively connected to the control circuit and the ID pin. Two ends of the second detection circuit are respectively connected to the control circuit and the first power pin. The first detection circuit detects an ID pin electrical signal of the ID pin to obtain a first detection signal and provides a feedback to the control circuit. The second detection circuit detects the first power pin signal of the first power pin to obtain a second detection signal and provides a feedback to the control circuit. The acquiring the electrical signal of the first connecter comprises: acquiring the first detection signal by using the first detection circuit, and acquiring the second detection signal by using the second detection circuit.

In contrast to the conventional art, the present disclosure provides a smart terminal. The smart terminal comprises a first connector, a charging circuit, a control circuit, and a detection circuit. The first connector is connected to a first external device. The first connector is a pogo pin. The charging circuit is connected to the first connector. The control circuit determines a control instruction according to an electrical signal of the first connector. The control instruction is configured to control the charging circuit and the first connector. The detection circuit is configured to detect the electrical signal of the first connector and provides a feedback to the control circuit. The present disclosure detects the electrical signal of the first connector through the detection circuit and provides a feedback to the control circuit. The control circuit can identify the first external device according to the electrical signal fed back from the detection circuit, thereby determining the control instruction, and then the charging circuit and the first connector are controlled differently such that the home Internet of Things can be realized.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

Figure 1:
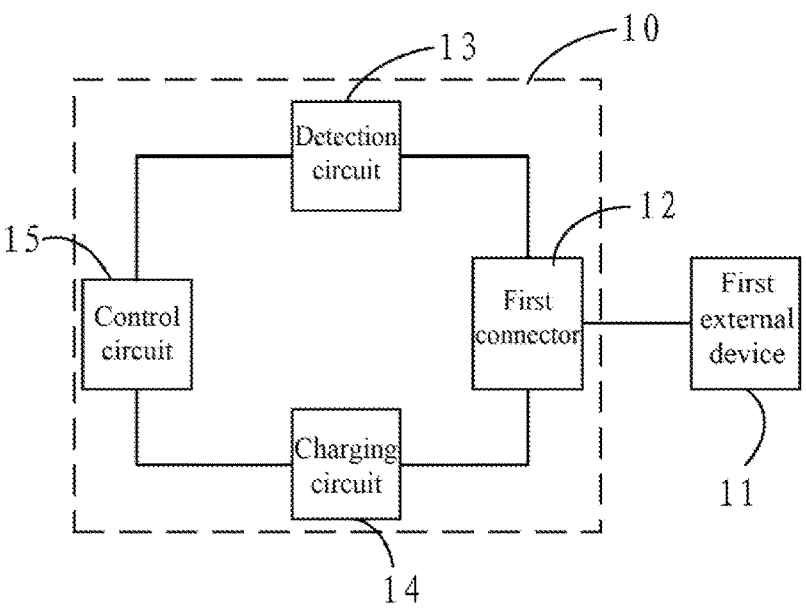
FIG. 1 is a block diagram of a smart terminal according to an embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Embodiments of the present disclosure are directed to a smart terminal and a method of controlling the smart terminal. The smart terminal comprises a first connector, a charging circuit, a control circuit, and a detection circuit. The first connector is connected to a first external device. The first connector is a pogo pin. The charging circuit is connected to the first connector. The control circuit determines a control instruction according to an electrical signal of the first connector. The control instruction is configured to control the charging circuit and the first connector. The detection circuit is configured to detect the electrical signal of the first connector and provides a feedback to the control circuit. The present disclosure detects the electrical signal of the first connector through the detection circuit and provides a feedback to the control circuit. The control circuit can identify the first external device according to the electrical signal fed back from the detection circuit, thereby determining the control instruction, and then the charging circuit and the first connector are controlled differently such that the home Internet of Things can be realized.

Figure 2:
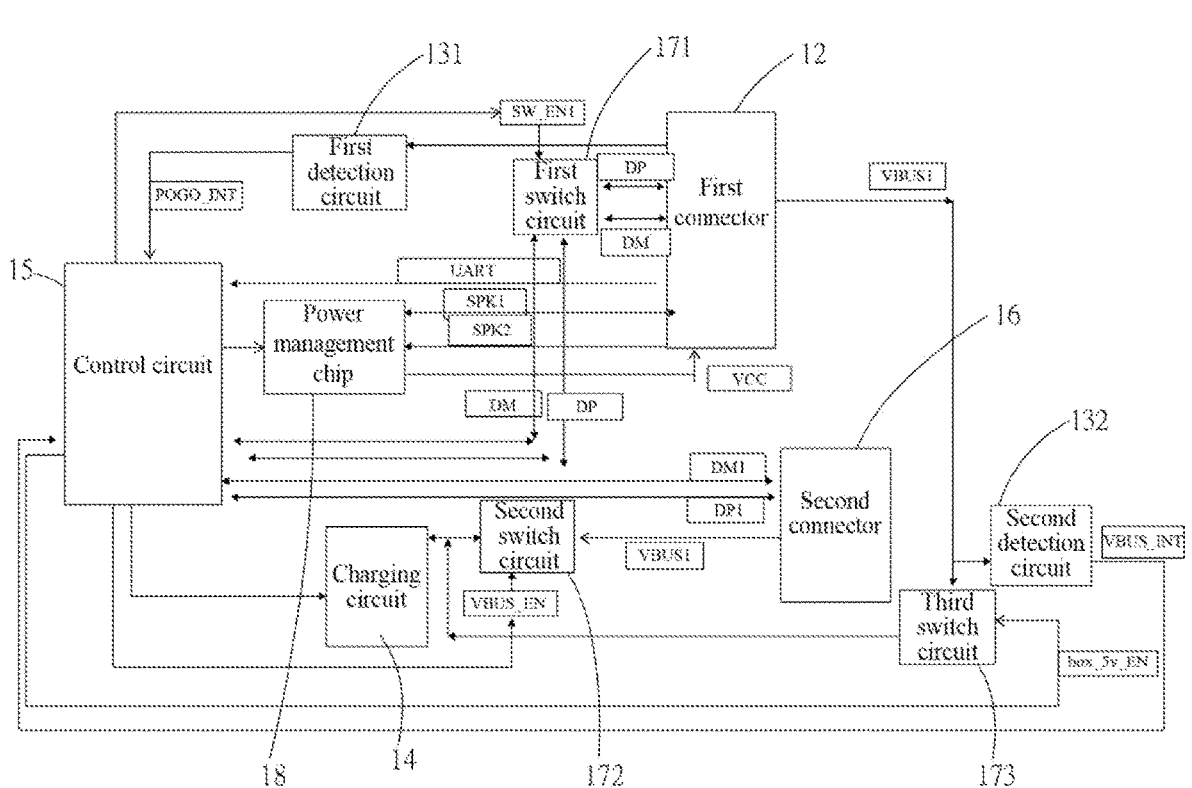
FIG. 2 is a diagram of a structure of the smart terminal shown in FIG. 1.

Please refer to FIGS. 1 and 2. FIG. 1 is a block diagram of a smart terminal according to an embodiment of the present disclosure. FIG. 2 is a diagram of a structure of the smart terminal shown in FIG. 1. The smart terminal 10 may be a smart device, a smart watch, a tablet and/or other smart devices. These changes all fall within the scope of the present disclosure.

Please refer FIGS. 1 and 2 again. The smart terminal 10 comprises a control circuit 15, a detection circuit 13, a first connector 12, and a charging circuit 14. The first connector 12 is used to be connected to the first external device 11. The detection circuit 13 is respectively connected to the control circuit 15 and the first connector 12. The detection circuit 13 is used to detect the electrical signal of the first connector 12 and provide a feedback to the control circuit 15 accordingly. The charging circuit 14 is respectively connected to the control circuit 15 and the first connector 12. The control circuit 15 is used to determine the control instruction based on the electrical signal of the first connector 12, and the control instruction is used to control the charging circuit 14 and the first connector 12. The present disclosure detects the electrical signal of the first connector 12 by the detection circuit 13 and provides a feedback to the control circuit 15 accordingly. The control circuit 15 could identify the first external device 11 according to the feedback the electrical signal fed back from the detection circuit 13 and determine the control instruction accordingly. In this way, the charging circuit 14 and the first connector 12 are controlled differently such that the home Internet of Things can be realized.

Preferably, the first connector 12 is a Pogo pin. Pogo pin is a precision connector used in electronic products, such as a mobile phone, which is widely used in a semiconductor equipment to play a connecting role. Pogo pin is a spring-loaded probe formed by the three basic components of a needle shaft, a spring and a needle tube after riveting and pre-pressing by precision instruments. There is a precision spring structure inside the Pogo pin. The surface plating of Pogo pin is generally gold-plated, which can better improve its anti-corrosion function, mechanical properties, electrical properties, etc. The needle tip has sharp needles, grasping needles, round needles, knife-shaped needles, etc. Pogo pin is generally used in precision connections in mobile phones, communications, automobiles, medical, aerospace and other electronic products and can improve the corrosion resistance, stability and durability of these connectors. Since Pogo pin is a very precise probe, it can reduce the weight of the connector and the volume of the appearance in precision connectors and thus can make the connector more delicate and beautiful.

The first connector 12 includes a first power pin, an identity (ID) pin, a first data pin, a second data pin, and a third data pin. In another embodiment, the first connector 12 may also include other pins, such as a ground pin. The first power pin is used to transmit the first power pin signal VBUS1, and the first power pin signal VBUS1 can be a voltage signal, such as VCC or VBUS1. Here, VCC is the working voltage provided by the smart terminal 10, and VBUS1 is the voltage inputted to the first connector 12 from the first external device 11. The ID pin is used to transmit the ID pin electrical signal. The first data pin is used to transmit the keyboard UART signal. The keyboard UART signals may include keyboard transmitting UART signals and keyboard receiving UART signals. The second data pin is used to transmit the left channel signal SPK1 and the right channel signal SPK2, and the third data pin is used to transmit the first negative data signal DM and the first positive data signal DP.

TABLE 1

| Smart terminal | | External device | | | |
|---|---|---|---|---|---|
| First power pin | VBUS1 (VCC) | Keyboard VCC | Speaker + Charging | Charging | Projection VBUS1 |
| ID pin | ID | ID | VBUS1 ID | VBUS1 | ID |
| First data pin | Keyboard UART | Keyboard UART | | | |
| Second data pin | SPK1 | | SPK1 | | |
| data pin | SPK2 | | SPK2 | | |
| Third data pin | DM | | | | DM |
| data pin | DP | | | | DP |

In an embodiment, the detection circuit 13 includes a first detection circuit 131 and a second detection circuit 132 connected in parallel. The first connector 12 includes an ID pin and a first power supply pin. The two ends of the first detection circuit 131 are respectively connected to the control circuit 15 and the ID pin. The two ends of the second detection circuit 132 are respectively connected to the control circuit 15 and the first power pin. The first detection circuit 131 detects the ID pin electrical signal of the ID pin to obtain the first detection signal POGO_INT and provides a feedback to the control circuit 15 accordingly. The second detection circuit 132 detects the first power pin signal VBUS1 of the first power pin to obtain a second detection signal VBUS_INT and provides a feedback to the control circuit 15 accordingly.

The first detection circuit 131 is an analog-to-digital converter (ADC). An analog-to-digital converter, or ADC for short, is an electronic component that converts an analog signal into a digital signal. A typical analog-to-digital converter converts an input voltage signal into an output digital signal. Since the digital signal itself has no practical meaning, it only represents a relative amplitude. Therefore, a analog-to-digital converter requires a reference analog amplitude as a conversion standard, and a common reference standard is the maximum convertible signal amplitude. The output digital amplitude indicates the amplitude of the input signal relative to the reference signal. For example, the reference voltage of the first detection circuit 131 is the first reference voltage. When the first external device 11 inputs the ID pin electrical signal through the first connector 12, the first detection circuit 131 determines whether the ID pin electrical signal is greater than the first reference voltage. If the first detection circuit 131 determines that the ID pin electrical signal is greater than the first reference voltage, the first detection signal POGO_INT the first preset value. For example, the first preset value could be 1 to represent a high voltage level. If the first detection circuit 131 determines that the ID pin electrical signal is not greater than the first reference voltage, the first detection circuit 131 further determines whether ID pin electrical signal is a ground voltage. If the ID pin electrical signal is not a ground voltage, the first detection signal POGO_INT is the second preset value. For example, the second preset value could be 0 to represent a low voltage level. If the ID pin electrical signal is a ground voltage, the first detection signal POGO_INT the third preset value. For example, the third preset value could be "/" to indicate that the first external device 11 is not connected.

The second detection circuit 132 is an N-type metal oxide semiconductor (NMOS) transistor. The reference voltage of the second detection circuit 132 is the second reference voltage. When the first external device 11 inputs the first power pin signal VBUS1 through the first connector 12, the first detection circuit 131 determines whether the first power pin signal VBUS1 is greater than the second reference voltage. If the second detection circuit 132 determines that the first power pin signal VBUS1 is greater than the second reference voltage, the second detection signal VBUS_INT is the fourth preset value. For example, the fourth preset value could be 1 to represent a high voltage level. If the second detection circuit 132 determines that the first power pin signal VBUS1 is not greater than the first reference voltage, then the second detection circuit 132 determines whether the first power pin signal VBUS1 is a ground voltage, if the first power pin signal VBUS1 is not a ground voltage, the first detection signal POGO_INT is the fifth preset value. For example, the fifth preset value could be 0 to represent a low voltage level. If the first power pin signal VBUS1 is a ground voltage, the first detection signal POGO_INT is the sixth preset value. For example, the sixth preset value could be "/" to indicate that the first external device 11 is not connected.

In another embodiment, the first detection circuit 131 may be a P-type metal oxide semiconductor (PMOS) transistor or an N-type metal oxide semiconductor (NMOS) transistor and the second detection circuit 132 may be an ADC or a PMOS transistor.

The first connector 12 includes a first data pin. The first data pin is connected to the control circuit 15 to transmit a first data signal UART. The smart terminal 10 includes a power management chip 18. The power management chip 18 is connected to the first power pin and the control circuit 15. The power management chip 18 provides a working voltage VCC according to the control instruction of the control circuit 15 to the first power pin. When the first detection circuit 131 detects that the first detection signal POGO_INT is 1 and the second detection circuit 132 detects that the second detection signal VBUS_INT is 0, the control circuit 15 transmits the keypad UART signal with the first data pin. At the same time, the control circuit 15 controls the power management chip 18 to input the working voltage VCC to the first power pin to provide the working voltage VCC to charge the keyboard.

The first connector 12 includes a second data pin. The power management chip 18 is connected to the control circuit 15 and the second data pin to transmit a second data signal between the control circuit 15 and the second data pin. The second data pin is used to transmit the left channel signal SPK1 and the right channel signal SPK2.

The smart terminal 10 includes a first switch circuit 171 and a second connector 16. The second connector 16 is used to be connected to a second external device. The first connector 12 includes a third data pin and the second connector 16 includes a fourth data pin. The control circuit 15 is connected to the third data pin through the first switch circuit 171 to transmit a third data signal, and the control circuit 15 is connected to the fourth data pin to transmit a fourth data signal. The third data signal includes the first negative data signal DM and the first positive data signal DP, and the fourth data signal includes the second negative data signal DM1 and the second positive data signal DP1. Specifically, the first switch circuit 171 may be a PMOS transistor or an NMOS transistor. Preferably, the second connector 16 is a Universal Serial Bus (USB) interface. Here, the USB is a standard for regulating the connection and communication between a computer and external devices.

The control end and the input end of the first switch circuit 171 are connected to the control circuit 15, and the output end of the first switch circuit 171 is connected to a third data pin. The control circuit 15 controls the on/off (on/off) state of the first switch circuit 171 through the first control signal SW_EN1.

The smart terminal 10 includes a second switch circuit 172. The second connector 16 includes a second power pin. The second power pin is used to transmit a second power signal VBUS2. The control end of the second switch circuit 172 is connected to the control circuit 15, the input end of the second switch circuit 172 is connected to the second power pin, and the output end of the second switching circuit 172 is connected to the charging circuit 14. The control circuit 15 controls the on/off state of the second switch circuit 172 through the second control signal VBUS_EN. The second switch circuit 172 is a PMOS transistor. In another embodiment, the second switch circuit 172 may be an NMOS transistor.

The smart terminal 10 includes a third switch circuit 173. The control end of the third switch circuit 173 is connected to the control circuit 15, the input end of the third switch circuit 173 is connected to the first power pin, and the output end of the third switching circuit 173 is connected to the charging circuit 14. The third switch circuit 173 is a PMOS transistor. In another embodiment, the third switch circuit 173 may be an NMOS transistor. The control circuit 15 controls the on/off state of the third switch circuit 173 through a third control signal box_5v_EN.

Figure 3:
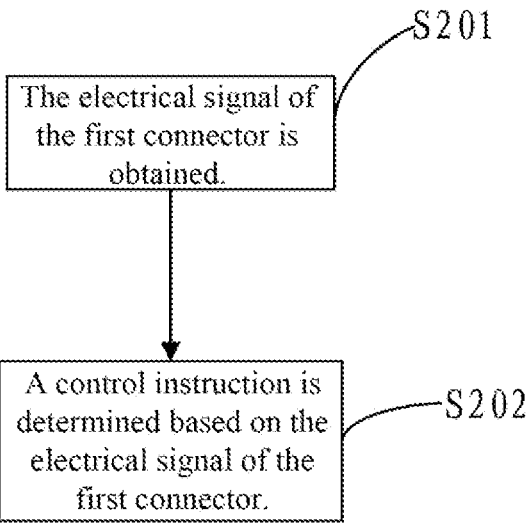
FIG. 3 is a flow chart of a control method of a smart terminal according to an embodiment of the present disclosure.

Please refer to FIG. 3. FIG. 3 is a flow chart of a control method of a smart terminal according to an embodiment of the present disclosure. As shown in FIG. 3, the present disclosure further discloses a control method. The control method comprises following steps:

Step S201: The electrical signal of the first connector is obtained.

In this embodiment, the first detection signal POGO_INT is obtained by the first detection circuit 131, and the second detection signal VBUS_INT is obtained by the second detection circuit 132.

Step S202: A control instruction is determined based on the electrical signal of the first connector.

In this embodiment, the control instruction is determined based on the first detection signal POGO_INT and the second detection signal VBUS_INT to control the charging circuit 14 and the first connector 12 of the smart terminal 10.

Specifically, please refer to the following Table 2:

| POGO_PIN | VBUS_PIN | First external device |
|---|---|---|
| 1 | 0 | Keyboard |
| 1 | 1 | Speaker + charging |
| 1 | / | Speaker |
| 0 | 1 | Charging |
| / | / | Disconnect |
| 0 | 0 | Projection |

If the first detection signal POGO_INT is the first preset value and the second detection signal VBUS_INT is the fifth preset value (the first detection signal POGO_INT is 1 and the second detection signal VBUS_INT is 0), it means that this is the keyboard mode and the control instruction is determined to be the first control instruction. Here, the first control instruction comprises: the control circuit 15 and the first data pin of the first connector 12 transmit the keyboard UART signal. At the same time, the control circuit 15 controls the power management chip 18 to input the working voltage VCC to the first power pin of the first connector 12 to provide the working voltage VCC to charge the keyboard.

If the first detection signal POGO_INT is the first preset value and the second detection signal VBUS_INT is the sixth preset value (the first detection signal POGO_INT is 1 and the second detection signal VBUS_INT is "/"), it means that this is the speaker mode and the control command is determined to be the second control command. Here, the second control instruction comprises: the control circuit 15 and the second data pin of the first connector 12 transmit the left channel signal SPK1 and the right channel signal SPK2.

If the first detection signal POGO_INT is the first preset value and the second detection signal VBUS_INT is the fourth preset value (the first detection signal POGO_INT is 1 and the second detection signal VBUS_INT is 1), it means that this is the speaker+charging mode, and the control command is determined to be the third control instruction. Here, the third control instruction comprises: the second data pin of the control circuit 15 and the first connector 12 transmits the left channel signal SPK1 and the right channel signal SPK2. At the same time, the control circuit 15 sends a third control signal box_5v_EN to the third switch circuit 173 to turn on the third switch circuit 173, such that the first power pin of the first connector 12 is connected to the charging circuit 14. In this way, the speaker charges the smart terminal 10.

If the first detection signal POGO_INT is the second preset value and the second detection signal VBUS_INT is the fourth preset value (the first detection signal POGO_INT is 0 and the second detection signal VBUS_INT is 1), then it means that this is the charging mode, and the control instruction is determined to be the fourth control instruction. Here, the fourth control instruction comprises: the control circuit 15 sends a third control signal box_5v_EN to the third switch circuit 173 to turn on the third switch circuit 173, such that the first power pin of the first connector 12 is connected to the charging circuit 14. In this way, the smart terminal 10 is charged.

If the first heartbeat POGO_INT is the third preset value, and the second heartbeat VBUS_INT is the sixth preset (the first heartbeat signal POGO_INT is /, and the second heartbeat signal VBUS_INT is /), it means that there is currently no external devices, and the control instruction is determined to be the fifth control instruction. Here, the fifth control instruction includes: no operation.

If the first detection signal POGO_INT is the second preset value, and the second detection signal VBUS_INT is the fifth preset value (the first detection signal POGO_INT is 0 and the second detection signal VBUS_INT is 0), it means that this is the projection mode, and the control instruction is determined to be the sixth control instruction. Here, the sixth control instruction comprises: the third data pin of the control circuit 15 and the first connector 12 transmit the first negative data signal DM and the first positive data signal DP.

Further, the fourth data pin of the second connector 16 is detected to check if there is a fourth data signal. If the fourth data pin of the second connector 16 has the fourth data signal, the control instruction is determined to be the seventh control instruction. The seventh control instruction comprises: the control circuit 15 and the second connector 16 the fourth data pin transmit the second negative data signal DM1 and the second positive data signal DP1. At the same time, the control circuit 15 turns off the first switch circuit 171 through a second control signal VBUS_EN to break the signal transmission path between the control circuit 15 and the third data pin of the second connector 12. If there is no data signal on the fourth data pin of the second connector 16, the control instruction is determined to be the eighth control instruction. The eighth control instruction comprises: the control circuit 15 turns on the first switch circuit 171 through the second control signal VBUS_EN, so that the first transmission negative data signal DM and the first positive data signal DP are transmitted between the third data pin of the second connector 15 and the second connector 12.

Further, the second power pin of the second connector 16 is detected to check whether there is a second power signal. If the second power pin of the second connector has the second power signal, the control instruction is determined to be the ninth control instruction. The ninth control instruction comprises: the control circuit 15 sends a third control signal box_5v_EN to the third switch circuit 173 to turn off the third switch circuit 173. At the same time, the control circuit 15 sends a second control signal VBUS_EN to the second switch circuit 172 to turn on the third switch circuit 172 such that the smart terminal is charged through the second connector 16.

In the above-mentioned embodiments, the descriptions of each embodiment have their own emphases. For the part that is not described in detail in a certain embodiment, refer to the detailed description of other embodiments above, and will not be repeated here.

During specific implementation, each of the above units or modules can be implemented as an independent entity, or can be combined arbitrarily as the same or several entities. The actual implementation of each of the above units or modules, could be referred to the above-mentioned embodiments and thus further illustrations are omitted here.

For the specific implementation of the above operations, reference may be made to the foregoing embodiments, and details are not repeated here.

Above are embodiments of the present disclosure directed to a smart terminal and a method of controlling the smart terminal. Specific examples are used to illustrate the principle and implementation of the present disclosure. The description of the above embodiments is only used to help understand the method and core idea of the present disclosure; meanwhile, for those skilled in the art, according to the application Thoughts, specific implementation methods and application ranges all have changes. In summary, the content of this specification should not be construed as limiting the present disclosure.

What is claimed is:

1. A smart terminal, comprising:
a first connector, connected to a first external device, wherein the first connector is a pogo pin;
a charging circuit, connected to the first connector;
a control circuit, configured to determine a control instruction according to an electrical signal of the first connector, wherein the control instruction is configured to control the charging circuit and the first connector; and
a detection circuit, connected to the control circuit and the first connector, configured to detect the electrical signal of the first connector and provides a feedback the electrical signal to the control circuit;
wherein the first connector comprises an ID pin and a first power pin, and the de circuit comprises:
a first detection circuit, connected to the control circuit and the ID pin, and configured to detect an ID pin electrical signal of the ID pin to obtain a first detection signal and to provide a feedback to the control circuit; and
a second detection circuit, connected in parallel with the first detection circuit and configured to detect the first power pin signal of the first power pin to obtain a second detection signal and to provide a feedback to the control circuit;
wherein the first connector comprises a first data pin, connected to the control circuit to transmit a first data signal; further comprising:
a power management chip, connected to the first power pin and the control circuit, configured to provide a working voltage to the first power pin according to the control instruction of the control circuit.

2. The smart terminal of claim 1, wherein the first connector comprises a second data pin, and the power management chip connects the control circuit and the second data pin so that a second data signal is transmitted between the control circuit and the second data pin.

3. The smart terminal of claim 1, further comprising:
a first switch circuit; and
a second connector, connected to a second external device;
wherein the first connector comprises a third data pin; the second connector comprises a fourth data pin; the control circuit is connected to the third data pin through the first switch circuit to transmit a third data signal; the control circuit is connected to the fourth data pin to transmit the fourth data signal.

4. The smart terminal of claim 3, wherein a control terminal and an input end of the first switch circuit are connected to the control circuit, and an output end of the first switch circuit is connected to the third data pin.

5. The smart terminal of claim 3, further comprising a second switch circuit; wherein the second connector comprises a second power pin configured to transmit a second power signal; a control end of the second switch circuit is connected to the control circuit, an input end of the second switch circuit is connected to the second power pin, an output end of the second switch circuit is connected to the charging circuit; the control circuit controls an on/off state of the second switch circuit.

6. The smart terminal of claim 1, further comprising a third switch circuit, wherein a control end of the third switch circuit is connected to the control circuit, and an input end of the third switch circuit is connected to the first power pin, and an output of the third switch circuit is connected to the charging circuit.

7. A smart terminal, comprising:
a first connector, connected to a first external device;
a charging circuit, connected to the first connector;
a control circuit, configured to determine a control instruction according to an electrical signal of the first connector, wherein the control instruction is configured to control the charging circuit and the first connector; and
a detection circuit, connected to the control circuit and the first connector, configured to detect the electrical signal of the first connector and provides a feedback the electrical signal to the control circuit;
wherein the first connector comprises an ID pin and a first power pin, and the detection circuit comprises:
a first detection circuit, connected to the control circuit and the ID pin, and configured to detect an ID pin electrical signal of the ID pin to obtain a first detection signal and to provide a feedback to the control circuit; and
a second detection circuit, connected in parallel with the first detection circuit and configured to detect the first power pin signal of the first power pin to obtain a second detection signal and to provide a feedback to the control circuit;
wherein the first connector comprises a first data pin, connected to the control circuit to transmit a first data signal; further comprising:
a power management chip, connected to the first power pin and the control circuit, configured to provide a working voltage to the first power pin according to the control instruction of the control circuit.

8. The smart terminal of claim 7, wherein the first connector comprises a second data pin, and the power management chip connects the control circuit and the second data pin so that a second data signal is transmitted between the control circuit and the second data pin.

9. The smart terminal of claim 7, further comprising:
a first switch circuit; and
a second connector, connected to a second external device;
wherein the first connector comprises a third data pin; the second connector comprises a fourth data pin; the control circuit is connected to the third data pin through the first switch circuit to transmit a third data signal; the control circuit is connected to the fourth data pin to transmit the fourth data signal.

10. The smart terminal of claim 9, wherein a control terminal and an input end of the first switch circuit are connected to the control circuit, and an output end of the first switch circuit is connected to the third data pin.

11. The smart terminal of claim 9, further comprising a second switch circuit; wherein the second connector comprises a second power pin configured to transmit a second power signal; a control end of the second switch circuit is connected to the control circuit, an input end of the second switch circuit is connected to the second power pin, an output end of the second switch circuit is connected to the charging circuit; the control circuit controls an on/off state of the second switch circuit.

12. The smart terminal of claim 7, further comprising a third switch circuit, wherein a control end of the third switch circuit is connected to the control circuit, and an input end of the third switch circuit is connected to the first power pin, and an output of the third switch circuit is connected to the charging circuit.

13. A method of controlling a smart terminal, the smart terminal comprising:
   a first connector, connected to a first external device;
   a charging circuit, connected to the first connector;
   a control circuit; and
   a detection circuit, connected to the control circuit and the first connector;
   the method comprising:
   acquiring an electrical signal of a first connecter; and
   determining a control instruction according to the electrical signal of the first connector, wherein the control instruction is configured to control the charging circuit and the first connector;
   wherein the detection circuit comprises a first detection circuit and a second detection circuit connected in parallel, the first connector comprises an ID pin and a first power pin, and two ends of the first detection circuit are respectively connected to the control circuit and the ID pin, two ends of the second detection circuit are respectively connected to the control circuit and the first power pin, the first detection circuit detects an ID pin electrical signal of the ID pin to obtain a first detection signal and provides a feedback to the control circuit, and the second detection circuit detects the first power pin signal of the first power pin to obtain a second detection signal and provides a feedback to the control circuit, wherein the acquiring the electrical signal of the first connecter comprises:
acquiring the first detection signal by using the first detection circuit, and acquiring the second detection signal by using the second detection circuit;
wherein the first connector comprises a first data pin, connected to the control circuit to transmit a first data signal; further comprising:
a power management chip, connected to the first power pin and the control circuit, configured to provide a working voltage to the first power pin according to the control instruction of the control circuit.

\* \* \* \* \*